(12) United States Patent
Goettfert et al.

(10) Patent No.: US 8,861,725 B2
(45) Date of Patent: *Oct. 14, 2014

(54) RANDOM BIT STREAM GENERATOR WITH ENHANCED BACKWARD SECRECY

(75) Inventors: Rainer Goettfert, Putzbrunn (DE); Berndt Gammel, Markt-Schwaben (DE); Markus Gail, Munich (DE); Wieland Fischer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 27 days.

This patent is subject to a terminal disclaimer.

(21) Appl. No.: 13/545,587

(22) Filed: Jul. 10, 2012

(65) Prior Publication Data

US 2014/0019502 A1    Jan. 16, 2014

(51) Int. Cl.
 *H04L 9/22* (2006.01)
 *H04L 9/06* (2006.01)

(52) U.S. Cl.
 CPC ................................. *H04L 9/0662* (2013.01)
 USPC ............................................. 380/44; 380/265

(58) Field of Classification Search
 None
 See application file for complete search history.

(56) References Cited

U.S. PATENT DOCUMENTS

| | | |
|---|---|---|
| 4,654,480 A | 3/1987 | Weiss |
| 4,815,130 A | 3/1989 | Lee et al. |
| 4,860,353 A * | 8/1989 | Brown .............................. 380/44 |
| RE36,181 E | 4/1999 | Koopman, Jr. et al. |
| RE36,752 E | 6/2000 | Koopman, Jr. et al. |
| 6,891,952 B1 | 5/2005 | Puehlhoefer et al. |
| 2005/0041803 A1 | 2/2005 | Chateau et al. |
| 2005/0120065 A1* | 6/2005 | Dirscherl et al. ............. 708/250 |
| 2007/0230694 A1* | 10/2007 | Rose et al. ...................... 380/46 |
| 2007/0244951 A1 | 10/2007 | Gressel et al. |
| 2009/0204656 A1 | 8/2009 | Goettfert et al. |
| 2009/0316898 A1 | 12/2009 | Omar et al. |
| 2010/0142705 A1* | 6/2010 | Reffe .............................. 380/46 |
| 2014/0040338 A1* | 2/2014 | Van Der Sluis et al. ....... 708/254 |

OTHER PUBLICATIONS

Killmann, Wolfgang. "Update of German Guidance for RNG Evaluation". Presentation Slides of Presentation on Sep. 23, 2009 during 10th ICCC, Tromsø, Norway, Sep. 22-24, 2009.

(Continued)

*Primary Examiner* — Gilberto Barron, Jr.
*Assistant Examiner* — Malcolm Cribbs
(74) *Attorney, Agent, or Firm* — Murphy, Bilak & Homiller, PLLC

(57) ABSTRACT

A random bit stream generator includes a plurality of feedback shift registers configured to store a plurality of bit values that represent an internal state of the random bit stream generator. Each feedback shift register includes a register input and a register output. The random bit stream generator further includes a Boolean output function configured to receive the plurality of register outputs from the plurality of feedback registers, to perform a first Boolean combination of the plurality of register outputs, and to provide a corresponding output bit, wherein a plurality of successive output bits forms a random bit stream. A feedback loop is configured to perform a second Boolean combination of the output bit with at least one register feedback bit of at least one of the feedback shift registers, so that the register input of the at least one feedback shift register is a function of the output bit.

24 Claims, 12 Drawing Sheets

(56) References Cited

OTHER PUBLICATIONS

"Bekanntmachung zur elektronischen Signatur nach dem Signaturgesetz und der Signaturverordnung", Bundesnetzagentur für Elektrizität, Gas, Telekommunikation, Post und Eisenbahnen (German Federal Network Agency), Draft of Sep. 28, 2011, Version of Dec. 30, 2011 published Jan. 18, 2012 in Bundesanzeiger (German Federal Gazette) Nr. 10, p. 243.

"Anwendungshinweise und Interpretationen zum Schema (AIS)", Bundesamt für Sicherheit in der Informationstechnik (German Federal Office for Information Security), AIS 20, Version 2.1, Dec. 2, 2011. pp. 1-5.

Paar, Christof et al. Understanding Cryptography: A Textbook for Students and Practitioners. Chapters 1-3. New York: Springer-Verlag, 2010.

Brown, Lawrie. "Cryptography—Lecture 12—Modern Stream Ciphers" CCS3 Lecture. UNSW, Canberra. Nov. 7, 2001. pp. 1-16.

* cited by examiner stream cipher in keystream mode stream cipher in keystream feedback mode

RANDOM BIT STREAM GENERATOR WITH ENHANCED BACKWARD SECRECY

FIELD OF INVENTION

Embodiments of the present invention relate to a random bit stream generator. Further embodiments of the present invention relate to a method for generating a random bit stream. Further embodiments of the present invention relate to a computer readable digital storage medium having stored thereon a method for generating a random bit stream. Further embodiments of the present invention relate to enhanced backward secrecy for key stream generators in hybrid random number generators (RNG).

BACKGROUND

A hybrid random number generator typically comprises a true random number generator (TRNG) and a cryptographic post processing. The true random number generator exploits a physically unpredictable effect (radioactive decay, thermal noise, jitter in oscillators, etc.) to generate random numbers. Typically, the physical random processes are digitized and a random bit sequence is obtained. This random bit sequence is typically termed raw data sequence. The raw data is typically further subjected to a mathematical post-processing in order to smooth certain technology-related effects, such as a bias, i.e., an imbalance of zeros and ones. The result is a random (bit) sequence that is used for applications (e.g., for the generation of cryptographic keys).

In the case of a hybrid random number generator, a cryptographic post-processing is connected downstream of the true random number generator.

SUMMARY

Embodiments of the present invention provide a random bit stream generator for generating a random bit stream. The random bit stream generator comprises a plurality of feedback shift registers, a Boolean output function, and a feedback loop. The plurality of feedback shift registers is configured to store a plurality of bit values that represent an internal state of the random bit stream generator. Each feedback shift register comprises a register input for receiving register input data and a register output for providing register output data. The Boolean output function is configured to receive the register output data provided by the plurality of feedback registers, to perform a first Boolean combination of the register output data, and to provide a corresponding output bit. A plurality of successive output bits form the random bit stream. The feedback loop is configured to perform a second Boolean combination of the output bit with at least one register feedback bit of at least one of the feedback shift registers so that the register input data for the at least one feedback shift register is a function of the output bit.

Further embodiments of the present invention provide a random bit stream generator which comprises an internal state memory, an output function, and an internal state modifier. The internal state memory is configured to store an internal state of the random bit stream generator. The output function is configured to use at least a portion of a current internal state for determining a current output bit of the random bit stream. The internal state modifier is configured to modify the internal state using at least another portion of the current internal state and the current output bit of the random bit stream.

Further embodiments of the present invention provide a random bit stream generator for generating a random bit stream which generator comprises: means for storing a plurality of bit values, means for determining successive output bits of the random bit stream, and means for updating the internal state. The plurality of bit values stored by the means for storing represent an internal state of the random bit stream generator. The means for determining successive output bits of the random bit stream do so on the basis of a Boolean combination of a portion of the bit values that represent the internal state. The means for updating the internal state do so on the basis of a current one of the successive output bits of the random bit stream and a current internal state of the random bit stream generator.

Further embodiments of the invention provide a method for generating a random bit stream. The method comprises: reading, from a state memory, a first portion of a current internal state of the method for generating the random bit stream, the first portion of the current internal state being represented by a plurality of bit values; determining a new output bit of the random bit stream on the basis of a Boolean combination of the plurality of bit values representing the first portion of the current internal state; determining at least one new input bit value for a next internal state on the basis of the new output bit and a second portion of the current internal state, and feeding the new input bit value to the state memory in order to modify the current internal state to the next internal state.

Further embodiments of the present invention provide a method for generating a random bit stream, the method comprising: determining a current output bit of the random bit stream by using a portion of a current internal state of the method for generating the random bit stream; and modifying the internal state using at least another portion of the current internal state and the current output bit.

Further embodiments of the present invention provide a computer readable digital storage medium having stored thereon a computer program having a program code for performing, when running on a computer, a method for generating a random bit stream as described in either one of the two preceding paragraphs.

BRIEF DESCRIPTION OF THE FIGURES

Embodiments of the present invention will be described using the accompanying figures, in which.

DETAILED DESCRIPTION

Before in the following embodiments of the present invention will be described in detail using the accompanying figures, it is to be pointed out that the same elements or elements having the same functionality are provided with the same or similar references numbers and that a repeated description of elements provided with the same or similar reference numbers is typically omitted. Hence, descriptions provided for elements having the same or similar reference numbers are mutually exchangeable. In the following description, a plurality of details are set forth to provide a more thorough explanation of embodiments of the present invention. However, it will be apparent to one skilled in the art that embodiments of the present invention will be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 1:
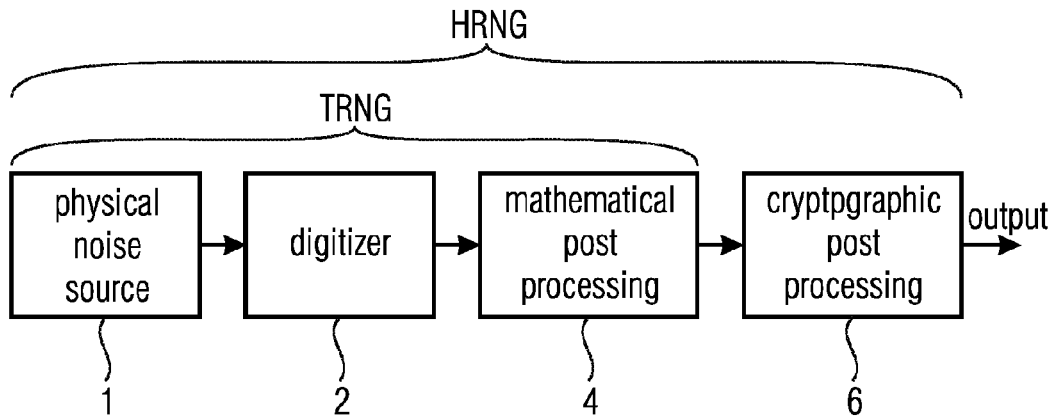
FIG. 1 is a schematic block diagram of a hybrid random number generator (HRNG)

FIG. 1 shows a schematic block diagram of a hybrid random number generator (HRNG). The HRNG comprises a physical noise source 1, a digitizer 2, a mathematical post-processing 4, and a cryptographic post-processing 6. The physical noise source 1, the digitizer 2, and the mathematical post-processing 4 are typically part of a true random number generator (TRNG). All four boxes, i.e., the physical noise source 1, the digitizer 2, the mathematical post-processing 4, and the cryptographic post-processing 6 represent the hybrid random number generator (HRNG).

When implemented in hardware, the implementation of the cryptographic algorithm that realizes the cryptographic post-processing typically requires a major portion of the area.

The rate at which the true random bits are input into the cryptographic post-processing 6 may be variable. At a rate of, for example, 5:1 the cryptographic post-processing 6 functions as a compressor for the true random bits. The rate may be 1:1 in which case the cryptographic post-processing 6 functions as a scrambler for the true random bits. The rate may even be as high as, for example, 1:512 in which case the cryptographic post-processing 6 has a property as expander. In the latter case, the hybrid RNG thus enhances the performance of the RNG: during the same time span more random numbers are provided for an application by the HRNG than the TRNG alone would be capable of.

As random number generators (RNGs) are incorporated into many products and play an important role in numerous cryptographic applications, they are often also subjected to evaluation by standardization bodies, governmental authorities, and/or other organizations that define minimum standards which need to be fulfilled by random number generators. A relatively newly added requirement is the so-called "enhanced backward secrecy" (also termed "backtracking resistance") which may be understood as follows. Let us assume that the TRNG has failed and that the cryptographic post-processing continues to run in an autonomous manner. In doing so, the cryptographic post-processing produces pseudo random numbers. Assume that r1, r2, r3, . . . is the bit sequence produced by the cryptographic post-processing (i.e., the pseudo random sequence). The cryptographic post-processing 6 has a memory on the order of typically some hundred bit. The content of this memory at a time instant t is called the internal state of the cryptographic algorithm at the time instant t and is designated herewith $S_t$. By means of an output function, the output bit $r_t$ is calculated at the time instance t from the internal state $S_t$, i.e., the t-th pseudo random bit. Subsequently, the internal state $S_t$ transitions to the subsequent state $S_{t+1}$—by executing a "next-state-function". From $S_{t+1}$ the output bit $r_{t+1}$ is calculated, and so forth.

Figure 2:
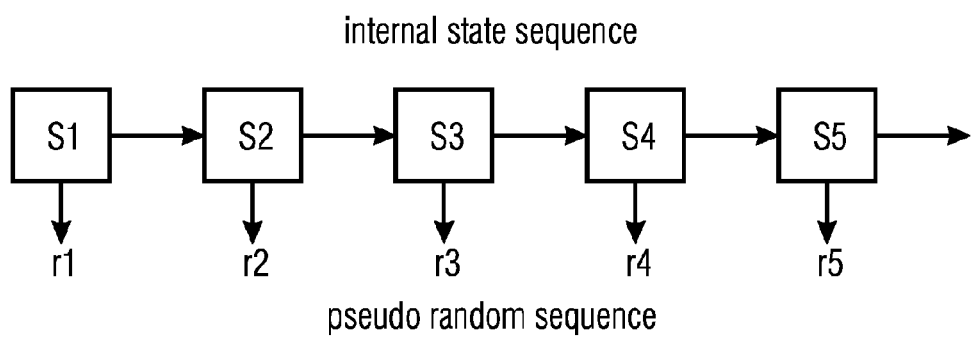
FIG. 2 is a schematic illustration of an operation of a cryptographic post-processing.

When the cryptographic post-processing 6 functions in an autonomous manner (and thus constitutes a pseudo random number generator, also called deterministic random number generator), a (quasi invisible) internal state sequence $S_1$, $S_2$, $S_3$, . . . is generated which in turn provides the pseudo random sequence $r_1$, $r_2$, $r_3$, . . . . This is schematically illustrated in FIG. 2.

Backward secrecy (i.e. regular backward secrecy) means: when an attacker knows all the pseudo random bits (or a large number of these bits) generated after the time instant t, the attacker must not be able to calculate previously generated pseudo random bits. In other words, even if the attacker knows, for example, the pseudo random bits $r_{1000}$, $r_{1001}$, $r_{1002}$, . . . , $r_{5000}$, he must not be able to calculate the bit $r_{999}$. Typically, each reasonable cryptographic algorithm processes this property.

The enhanced backward secrecy is a more stringent requirement than the backward secrecy: assume that the attacker knows all pseudo random bits generated after the time instant t and in addition also the internal state $S_t$ at the time instant t. According to the concept of enhanced backward secrecy, the attacker should not be able to determine previously generated pseudo random bits. In general, a cryptographic algorithm does not exhibit this property. The philosophy behind the design of a cryptographic algorithm is almost always that the internal state is secret. Indeed, the following holds true for most cryptographic algorithms: a cryptographic algorithm is regarded as broken when one has calculated the cryptographic key (key recovery attack) or when one has calculated the internal state (state recovery attack).

Accordingly, a crypto algorithm needs to be extended, upgraded or modified so that it exhibits the required property of "enhanced backward secrecy".

One example of a cryptographic algorithm is the advanced encryption standard (AES). This is a 128 bit block cipher. Input and output have 128 bits, i.e., a 128-bit block of input data is encrypted in a block-wise manner and produces a 128-bit block of output data (the employed key length is typically 128 bit, too).

Figure 3:
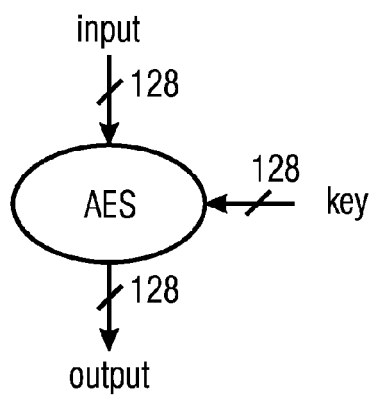
FIG. 3 illustrates input and output of a block cipher, in particular according to the Advanced Encryption Standard (AES)

FIG. 3 schematically illustrates the AES encryption of a 128-bit block of input data with a 128-bit key to obtain a 128-bit block of output data.

When the advanced encryption standard is used as a cryptographic post-processing in a hybrid RNG, the AES needs to be used several times in order to obtain the property of enhanced backward secrecy. This is schematically illustrated in block diagram form in FIG. 4.

The internal state comprises two 128-bit blocks 412, 414 at a time instant n. The first block 412 contains the state S1(n) and the second block 414 contains the second state S2(n). The first state S1(n) is provided as an input to a first AES instance 422 and as a key to a second AES instance 424. The second state S2(n) is provided as an input to the second AES instance 424 and as a key (dotted line) to the first AES instance 422. Furthermore, the first state S1(n) is also XOR-combined with the 128 bit output of the first AES instance 422 by means of a 128-bit XOR function 432. Likewise, the second 128-bit block of the internal state S2(n) is XOR-combined with the output of the second AES instance 424 by means of a second 128-bit XOR-function 434. At an output of the first XOR-function 432, the first block S1(n+1) 442, i.e., a first half of the next internal state at time n+1, is obtained. At an output of the second XOR-function 423 the second block S2(n+1) 444 of the internal state at time n+1 is obtained. In this manner, the "next state function" is implemented by means of the components 422, 432, 424 and 434.

In order to determine the output of the hybrid RNG, the first 128-bit block S1(n) 412 and the second 128-bit block S2(n) 414 are XOR-combined by means of a XOR-function 455. An output of the XOR-function 455 is provided as a key to a further AES instance 457 that receives the second 128-bit block S2(n) as an input. The second 128-bit block S2(n) is also provided to an XOR-function 459 in order to be XOR-combined with an output of the further AES instance 457. The output of the hybrid RNG is then available at an output of the 128-bit XOR-function 459.

Figure 4:
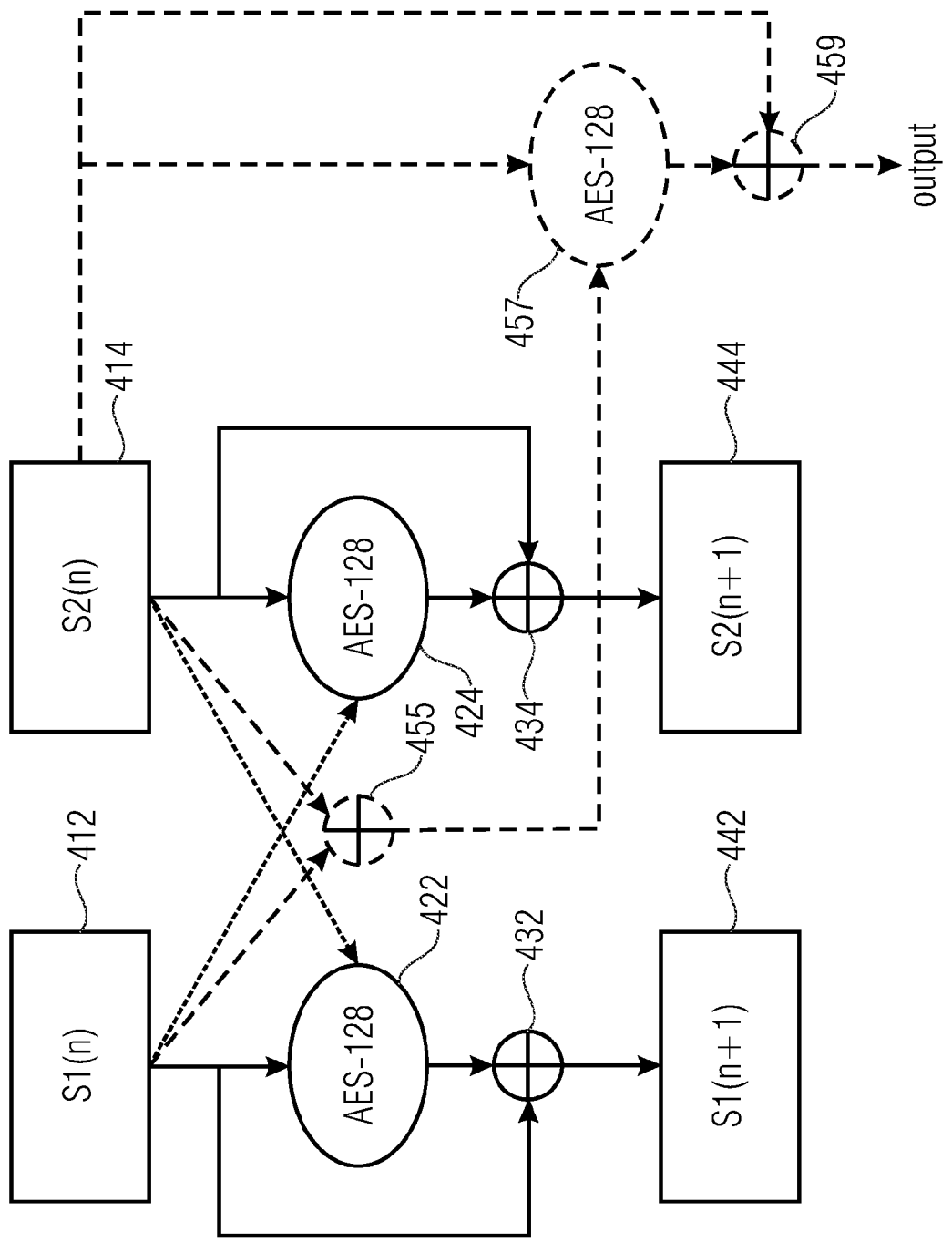
FIG. 4 illustrates a schematic block diagram of a cryptographic post-processing for a hybrid RNG using several instances of the AES.

FIG. 4 may be summarized as follows. The oval shape symbolizes the AES-algorithm. The arrow arriving from the top symbolizes the input (corresponding to the plain text). The arrow to the bottom provides the output (corresponding to the cipher text). The arrow arriving from the side symbolizes the employed AES key. The four rectangles symbolize artificially created memories. Each of the four memories contains a 128 bit entry. The two upper boxes 412, 414 represent the internal state at the time instant n. Hence, the internal state has 256 bit. The two lower boxes 442, 444 correspond to the internal state at the time instant n+1. The internal stage at the time instant n+1 has 256 bits, as well.

The two AES instances 422, 424 implement the next-state-function of the crypto algorithm. The AES instance 457 drawn in a dashed line implements the output function of the crypto algorithm.

Accordingly, a larger crypto algorithm has been created by means of the AES. This larger algorithm possesses the property of enhanced backward secrecy, whereas a simple AES-based crypto algorithm as, for example, illustrated in FIG. 3, typically does not possess the property of enhanced backward secrecy.

Note that the AES algorithm itself does not possess an internal state. For this reason, an internal state needs to be created in an artificial manner. The AES is a block cipher.

Besides the class of block ciphers, the class of so-called stream ciphers exists. A stream cipher typically (or always) possesses an internal state (internal secret state).

The solution schematically illustrated in FIG. 4 typically requires a large area and has a high power consumption. Furthermore, the hybrid RNG schematically illustrated in FIG. 4 has a 128-bit granularity. Even when, for example, only 16 random bits are needed, 128 random bits inevitably have to be generated.

In embodiments a stream cipher is used instead of a block cipher as a crypto algorithm in a hybrid RNG. Stream ciphers produce the output bits typically in a bitwise manner (bit granularity).

Figure 5:
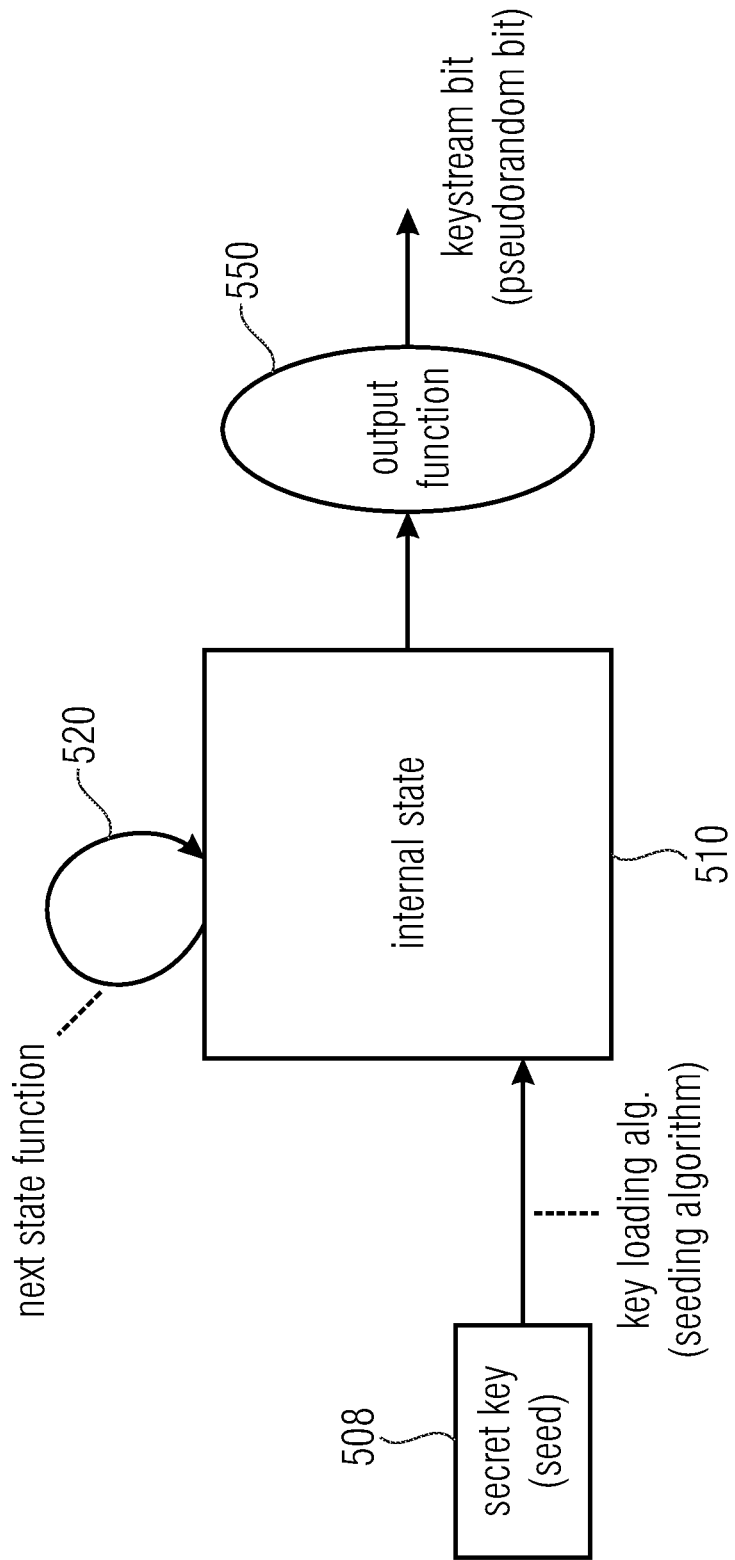
FIG. 5 shows a schematic block diagram of a stream cipher.

FIG. 5 shows a schematic illustration of a stream cipher which will be used to describe some basic terminology of stream ciphers. The stream cipher comprises, or is based on, an internal state 510, a next state function 520 and an output function 550. By means of the next state function 520 the internal state 510 is updated. The next state function 520 receives as an input the internal state at a time instant t and produces as an output the internal state at a time instant t+1. In other words, $S_{t+1}$ is generated out of $S_t$.

For each time instant t the output function 550 generates the output bit $r_t$ out of the internal state $S_t$ 510. Accordingly, the output function 550 takes as an input the internal state $S_t$ 510 (which typically is some hundred bit big) and therefrom produces the single bit $r_t$. This single bit $r_t$ is called "key stream bit" in case the stream cipher is used for encryption. In case the stream cipher is used as a pseudo random number generator, the single bit $r_t$ is called a pseudo random bit (NB: each stream cipher is typically a pseudo random number generator. However, not every pseudo random number generator is suitable to be used as a stream cipher).

Initially, the internal state 510 is empty. The state is loaded with a secret key. In this manner $S_0$ is created, the initial state or initial internal state. In principle it is possible to assign the key bits directly to the memory cells in the initial internal state. More frequently, however, the key is introduced in a different manner, by execution of a so-called "key loading algorithm".

Using a stream cipher, a long key stream (which may be approximately 2^40 or 2^64 bit long or even longer) is generated out of a short key (e.g., 256 bit).

When using the same algorithm not as a stream cipher but as a pseudo random number generator, the key is instead called a "seed", the key loading algorithm is instead called a "seeding algorithm" and the key stream is instead called "pseudo random sequence".

Also for stream ciphers the statement holds that they do not, in general, have the property of "enhanced backward secrecy". The modification described below brings about the property of enhanced backward secrecy for (some) stream ciphers.

Figure 6:
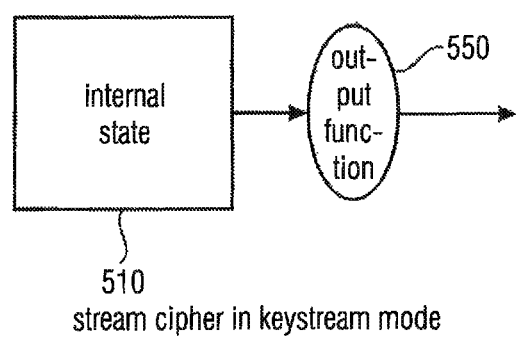
FIG. 6 illustrates a stream cipher in key stream mode.

Consider FIG. 6 which schematically illustrates a stream cipher in the so-called key stream mode. The internal state already has been initialized. Now the algorithm runs without input and permanently produces key bits. The property of backward secrecy is given but—in general—not the property of an enhanced backward secrecy.

Figure 7:
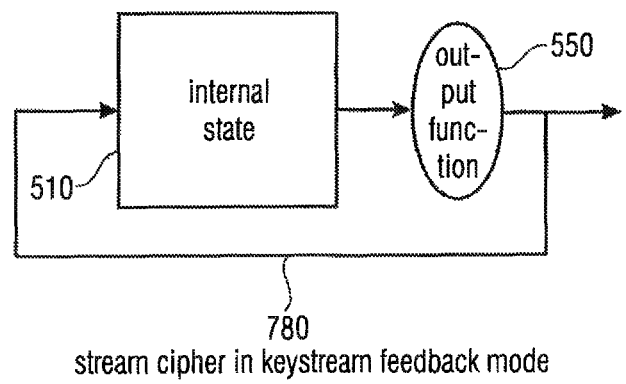
FIG. 7 illustrates a stream cipher in key stream feedback mode according to embodiments.

FIG. 7 shows a schematic block diagram of a general stream cipher in the so-called key stream feedback mode. Again, the apparatus runs in an autonomous manner (no external input; the apparatus has already been initialized). The produced key stream is used completely or partially.

Concurrently the key stream is permanently fed into the internal state in the same manner—or a similar manner—as in the beginning the seed has been fed in. This is achieved by means of a feedback loop 780 which connects an output of the (Boolean) output function 550 with an input of the internal state memory 510 which is, e.g., a plurality of feedback shift registers.

With some stream ciphers this results in the property of enhanced backward secrecy to be created.

At least according to some embodiments it is proposed to operate a stream ciphers permanently in key stream feedback mode when it is employed as a cryptographic post-processing in a hybrid RNG for which the property of enhanced backward secrecy is required.

Remark 1: A large number and very differently defined stream ciphers exist. Whether the property of enhanced backward secrecy can be obtained therefore also depends on the type of the stream cipher and/or its definition.

Remark 2: There are stream ciphers (which are, however, assumed to be an exception) for which the key stream feedback mode leads to the internal state $S_t$ having several, e.g., two predecessor internal states $S_{t-1}$ and $S'_{t-1}$, due to the action of feeding back the key stream. Actually, this property is not undesired. Ambiguity with respect to the past in any event supports the sought property of enhanced backward secrecy. However, as a consequence of the ambiguity the internal state also loses entropy. For this reason, these stream ciphers need to be precisely analyzed in key stream feedback mode. When they permanently lose entropy they may be operated for short durations of time, only. Then, new entropy needs to be reloaded from the TRNG (remember that the stream cipher may be part of a hybrid RNG). In other words, these stream ciphers may be operated at a small expansion rate, only. There internal state needs to be supplied with fresh entropy (from the TRNG) in a timely manner.

Remark 3: For most stream ciphers the property of enhanced backward secrecy in key stream feedback mode is obtained by the creation of a sort of hash function (one-way function). This means that the predecessor internal state is, on the one hand, unambiguously (unequivocally) determined but, on the other hand, practically difficult to calculate. More precisely, it may be sufficient that those bits of the predecessor internal states are difficult to calculate which form the input for the stream cipher output function (reference sign 550 in FIGS. 5 to 7).

Figure 8:
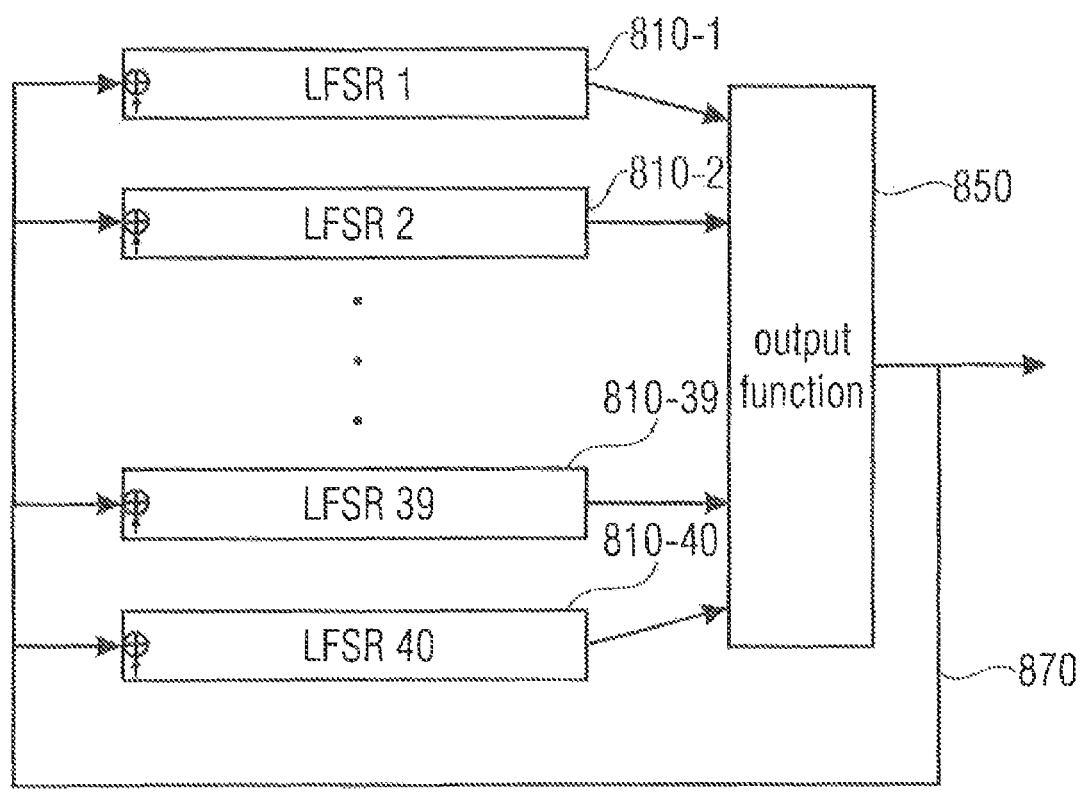
FIG. 8 shows a schematic block diagram of a stream cipher according to further embodiments.

FIG. 8 shows, in schematic block diagram form, an illustrative example. The random bit stream generator shown in FIG. 8 is based on a classical stream cipher. The internal state (or internal state memory) comprises several linear feedback shift registers (LFSRs) 810-1, 810-2, ... 810-39 and 810-40 (in the depicted case 40 LFSRs). The feedback functions of the LFSRs are not shown in FIG. 8 for lack of space. The different LFSRs may have different lengths. The cells of all LFSRs together (e.g., all flip flops) make up the internal state.

The next state function is implemented by switching all shift registers concurrently by one clock period. The content of the foremost cell of each shift register is fed to the Boolean combination function 850. The Boolean combination function (Boolean output function) 850 produces from its forty input bits one output bit, i.e., the key stream bit or the pseudo random bit $r_t$.

The last cell of each shift register receives a new value. This new value may be, for example, the sum (modulo 2, i.e., XOR) of the key stream bit $r_t$ and the respective feedback value of each single shift register.

Note that except for the foremost cell contents (which are output from the shift registers 810-1 to 810-40 and further processed by the Boolean combination logic 850) all other cell contents have only been shifted. With respect to the enhanced backward secrecy this means that an attacker who knows the internal state $S_t$ at the time instant t also knows a major portion of the predecessor internal state $S_{t-1}$. Only forty cells of the predecessor internal state $S_{t-1}$ are unknown to the attacker. However, this does not contradict the required property of enhanced backward secrecy. The reason is that a backward secrecy of the output sequence $r_{t-3}, r_{t-2}, r_{t-1}, \ldots$ is required for enhanced backward secrecy, but not a backward secrecy of the sequence of internal states $S_{t-3}, S_{t-2}, S_{t-1}, \ldots$.

Continuing with the assumption that an attacker has been able to obtain the internal state $S_t$ at the time instant t, forty cells of the predecessor internal state $S_{t-1}$ are unknown to the attacker. For their assignment there are $2^{40}$ possibilities. When testing all these possibilities there will be exactly one that produces the known internal state $S_t$. Accordingly, the enhanced backward secrecy is given in this case with a strength of $2^{40}$ computation steps which provides a certain—even though not an insurmountable—obstacle.

Of course, this is only an example. For other stream ciphers, other values may be applicable.

Hence, FIG. 8 schematically illustrates one possible embodiment of a random bit stream generator that may be used as a stream cipher or as a (deterministic) random number generator. The random bit stream generator comprises a plurality of feedback shift registers 810-1 to 810-40 that are configured to store a plurality of bit values that represent the internal state of the random bit stream generator. Each of the feedback shift registers comprises a register input (referred to above as the "last cell") and a register output (referred to above as the "foremost cell"). The random bit stream generator further comprises a Boolean output function 850 configured to receive the plurality of register outputs from the plurality of feedback registers 810-1 to 810-40. The Boolean output function 850 is further configured to perform a first Boolean combination of the plurality of register outputs and to provide a corresponding output bit. A plurality of successive output bits form the random bit stream. The random bit stream generator also comprises a feedback loop 870 configured to perform a second Boolean combination of the output bit with at least one register feedback bit of at least one of the feedback shift registers 810-1 to 810-40, so that the register input of the at least one feedback shift register is a function of the output bit. In FIG. 8, the second Boolean combination is schematically illustrated by XOR gates at the left ends of the linear feedback shift registers 810-1 to 810-40.

The random bit stream generator as schematically illustrated in FIG. 8 may also be described as follows. The random bit stream generator comprises an internal state memory 810-1 to 810-40 which is configured to store an internal state of the random bit stream generator. The random bit stream generator further comprises an output function 850 configured to use at least a portion of a current internal state for determining a current output bit of the random bit stream. The portion of the current internal state that is used for determining the current output bit may be, for example, the foremost cells of the 40 shift registers 810-1 to 810-40. Furthermore, the random bit stream generator comprises an internal state modifier which is configured to modify the internal state using at least another portion of the current internal state and also the current output bit of the random bit stream. The other portion of the current internal state may comprise selected cells of the various shift registers 810-1 to 810-40. Typically, each of the LFSR 810-1 to 810-40 performs a "self-contained" feedback that only uses a subset of the cells of the respective shift register and no cells of any one of the other shift registers. According to embodiments, the current output bit of the random bit stream is also used for modifying the internal state. Note that the output function 850 may comprise a delay so that the current output bit of the random bit stream actually is related to a preceding internal state of the random bit stream generator.

The plurality of shift registers 810-1 to 810-40 are one of several possible examples for a means for storing a plurality of bit values that represent an internal state of the random bit stream generator. The output function 850 is one of several possible examples of a means for determining successive output bits of the random bit stream on the basis of a Boolean combination of a portion of the bit values that represent the internal state. The feedback loop or internal state modifier 870 is one of several possible examples of a means (or a part thereof) for updating the internal state on the basis of a current one of the successive output bits of the random bit stream and a current internal state of the random bit stream generator.

Figure 9:
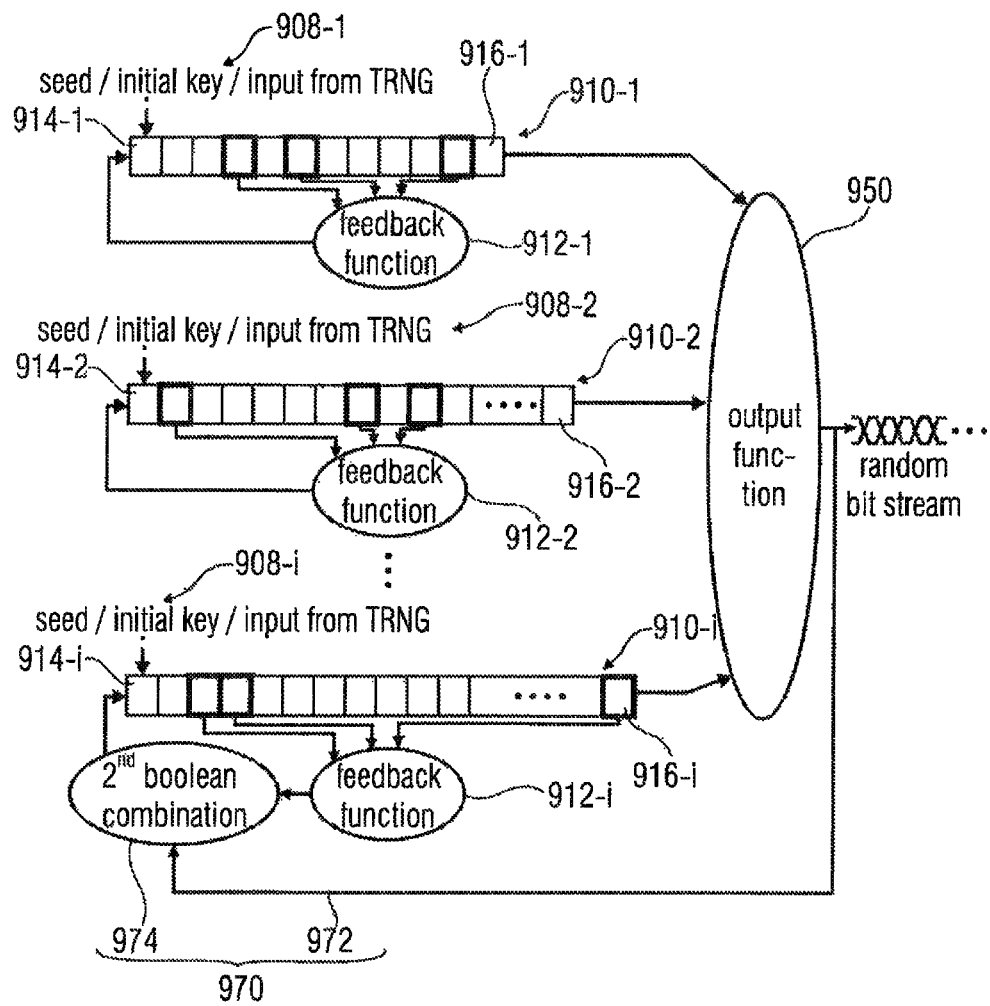
FIG. 9 shows a schematic block diagram of a random bit stream generator according to embodiments.

FIG. 9 shows a schematic block diagram of a random bit stream generator according to embodiments. The random bit stream generator comprises a plurality of feedback shift registers 910-1, 910-2, ..., 910-i. Each of the plurality of feedback shift registers 910-1 to 910-i comprises a feedback function 912-1, 912-2, ..., 912-i. Each feedback function is configured to determine the register feedback bit of the corresponding feedback shift register on the basis of a Boolean combination of selected bit values stored by the corresponding feedback shift register 910-1 to 910-i. In FIG. 9, the three illustrated feedback shift registers 910-1 to 910-i comprise the respective register feedback bits 914-1, 914-2 and 914-i. The cells of the feedback shift registers 910-1 to 910-i corresponding to the selected bit values are indicated in FIG. 9 by thick outlines.

The random bit stream generator comprises a (Boolean) output function 950. The output function 950 may also be regarded as a means for determining successive output bits of the random bit stream on the basis of a (Boolean) combination of a portion of the bit values that represent the internal state, e.g., the output bits 916-1, 916-2, ..., 916-i of the shift registers 910-1 to 910-i.

The feedback loop 970 comprises a connection 972 between an output of the output function 950 and an input of a second Boolean combination 974. Another input for the second Boolean combination 974 is provided by the feedback function 912-i of the i-th shift register 910-i. An output of the second Boolean function 974 is fed to the input bit 914-i of the shift register 910-i. In this manner the output bit is combined with at least one register feedback bit (provided at the output of the feedback function 912-i) of at least one of the feedback shift registers (namely the feedback shift register 910-i), so that the register input 914-i of the at least one feedback shift register 910-i is a function of the output bit.

According to embodiments at least one of the plurality of feedback shift registers 910-1 to 910-i or even all feedback shift registers may be a linear feedback shift register. Alternatively, at least one of the plurality of feedback shift registers or all of them may be a non-linear feedback shift register. Yet another option would be that some of the feedback shift registers are linear feedback shift registers and the remaining feedback shift registers are non-linear feedback shift registers.

As schematically indicated in FIG. 9, at least two of the plurality of feedback shift registers 910-1 to 910-i may have different lengths.

The second Boolean combination 974 performed by the feedback loops 970 may be an exclusive OR-combination of the output bit and the register feedback bit of the at least one feedback register.

The random bit stream generator may further comprise a state initializer configured to initialize the internal state of the feedback shift registers 910-1 to 910-i on the basis of a seed information, an initial key or an input from a TRNG. The respective seeds/initial keys/inputs 908-1, 908-2, ..., 908-i from TRNG are schematically illustrated in FIG. 9. As mentioned above, entropy may be reloaded to the internal state by feeding an external input 908-1 to 908-i to the input bits 914-1 to 914-i of the shift registers 910-1 to 910-i. In embodiments, the state initializer may comprise a logical initializing function configured to receive the seed information (or the initial key(s) or the input(s) from TRNG) 908-1 to 908-i as an input and to load the plurality of feedback shift registers with the bit values representing an initial state of the random bit stream generator that is associated to the seed information (or initial key or input from TRNG).

In embodiments the random bit stream generator may further comprise a random information interface configured to receive a random bit sequence from a random generator. The feedback loop may be configured to process the random bit sequence so that the register input of the at least one feedback shift register is also a function of the random bit sequence. The random information interface provides another option for reloading fresh entropy to the internal state.

The random bit stream generator may be a random number generator or a pseudo random number generator. In alternative embodiments the random bit stream generator may be, or used as, a stream cipher or a stream cipher generator.

Figure 10:
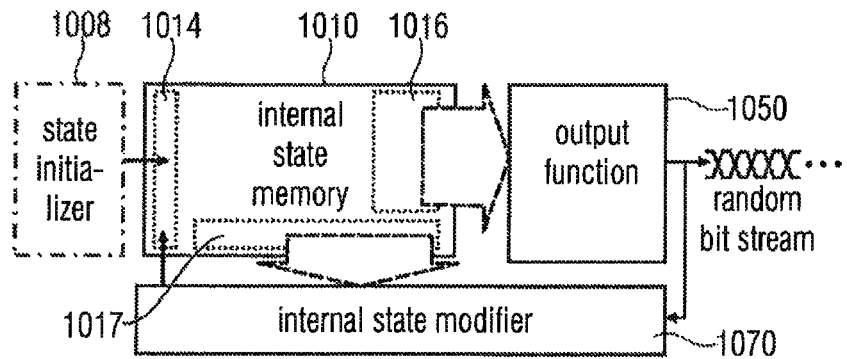
FIG. 10 shows a random bit stream generator according to further embodiments.

FIG. 10 shows a schematic block diagram of a random bit stream generator according to at least some further embodiments. The random bit stream generator comprises an internal state memory 1110, an output function 1150 and an internal state modifier 1170. The internal state memory 1010 is configured to store an internal state of the random bit stream generator. The output function 1050 is configured to use at least a portion 1016 of a current internal state for determining a current output bit of the random bit stream. The internal state modifier is configured to modify the internal state using at least another portion 1017 of the current internal state and also the current output bit of the random bit stream. Accordingly, the internal state modifier feeds back a modifying information to an input portion 1014 of the internal state memory 1010. The internal state memory may comprise a plurality of shift registers.

The random bit stream generator may further comprise a state initializer 1008 configured to initialize the internal state of the random bit stream generator on the basis of a seed information or an initial key or an input from a TRNG. For example, the state initializer 1008 may load the initializing information into the input portion 1014 of the internal state memory 1010. However, alternative options are also possible for loading an initial state or a seed information to the internal state memory 1010 by means of the state initializer 1008.

The state initializer 1008 may comprise a logical initializing function configured to receive the seed information etc. as an input and to load the internal state memory with the bit values representing the initial state of the random bit stream generator that is associated to the seed information.

The random bit stream generator schematically illustrated in FIG. 10 may further comprise a random information interface (not shown) configured to receive a random bit sequence from a random generator (e.g., a TRNG), wherein the internal state modifier may be configured to process the random bit sequence so that the internal state is also a function of the random bit sequence. As mentioned above, such a structure may be used to reload fresh entropy to the internal state.

The internal state memory 1010 may be regarded as a means for storing a plurality of bit values that represent an internal state of the random bit stream generator. The output function 1050 may be regarded as a means for determining successive output bits of the random bit stream on the basis of a Boolean combination of a portion of the bit values that represent the internal state. The internal state modifier 1070 may be regarded as a means for updating the internal state on the basis of a current one of the successive output bits of the random bit stream and also a current internal state (or a portion thereof) of the random bit stream generator.

Figure 11:
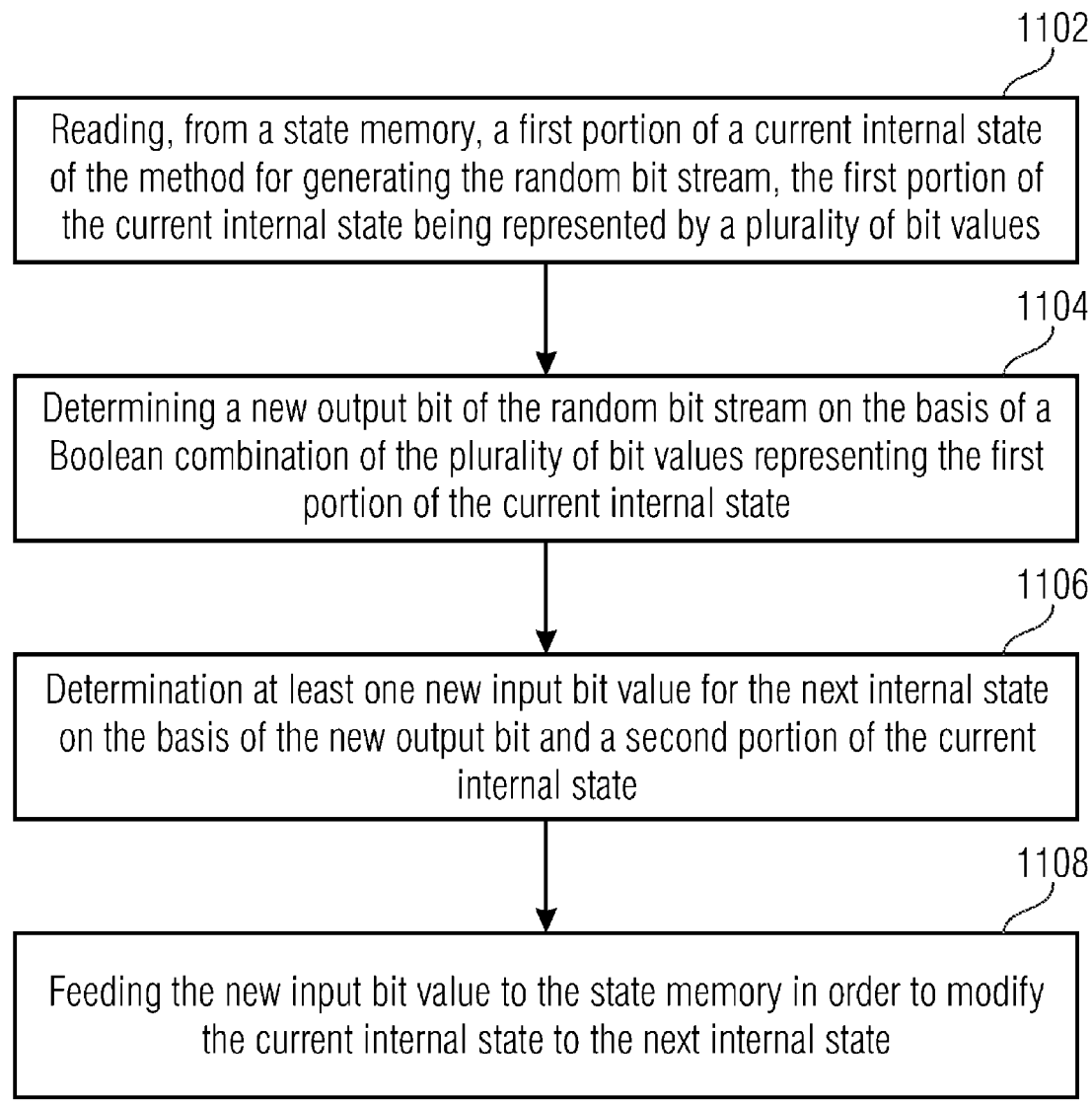
FIG. 11 shows a schematic flow diagram of a method for generating a random bit stream according to embodiments.

FIG. 11 shows a schematic flow diagram of a method for generating a random bit stream according to embodiments. The method comprises a step or action 1102 of reading or retrieving, from a state memory, a first portion of a current internal state of the method for generating the random bit stream. The first portion of the current internal state is represented by a plurality of bit values. The state memory may comprise a plurality of feedback shift registers. At a subsequent step or action 1104 a new output bit of the random bit stream is determined on the basis of a Boolean combination of the plurality of bit values representing the first portion of the current internal state.

At least one new input bit value for a next internal state is then determined at step 1106 on the basis of the new output bit and a second portion of the current internal state. This determination of the at least one new input bit value for the next internal state may comprise: performing a logical combination of the new output bit and a second portion of the internal state. The second portion may be represented by a plurality of feedback bits provided by the current internal state.

At a step or action 1108, the new input bit value is fed to the state memory in order to modify the current internal state to the next internal state. In embodiments, this feeding of the new input to the state memory may comprise: feeding a plurality of new input bit values to the plurality of feedback shift registers at respective input bits of the plurality of feedback shift registers.

In some embodiments, the method may further comprise an action of initializing the internal state by feeding a seed information (or an initial key or an input from a TRNG) to the state memory prior to the step of reading the first portion of the current internal state. In this manner, the state memory is initialized, for example when a new task or application is started, such as the generation of a new stream cipher or cryptographic key.

In embodiments, the method may be performed iteratively. After a predetermined number of iterations or after a random number of iterations the method may further comprise: receiving a random information from a random number generator and using the random information when determining the at least one new input bit value for the next internal state. In this manner, the new input bit value is determined on the basis of the new output bit, the second portion of the current internal state, and also on the basis of the random information.

Figure 12:
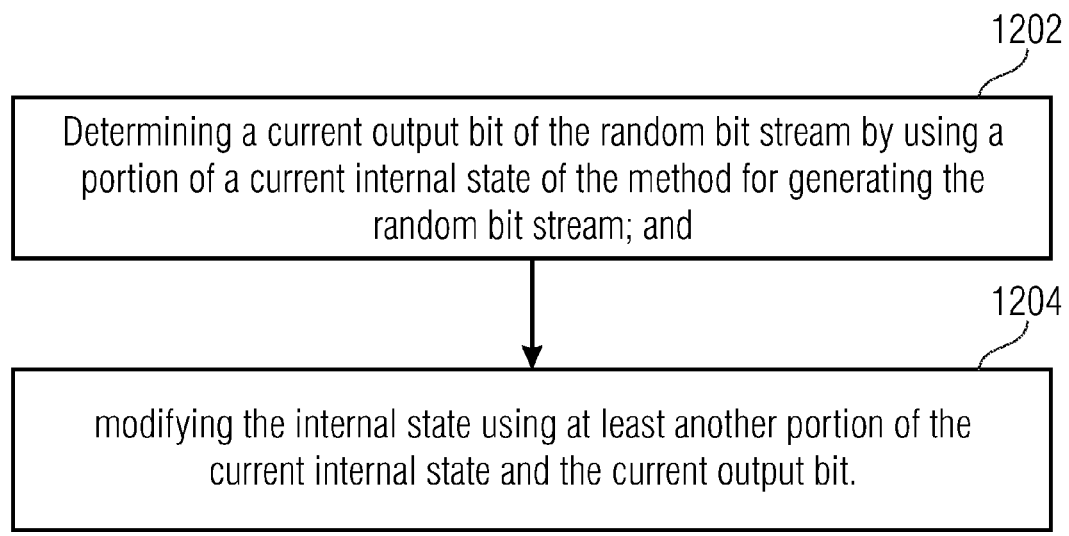
FIG. 12 shows a schematic flow diagram of a method for generating a random bit stream according to further embodiments.

FIG. 12 shows a schematic block diagram of a method for generating a random bit stream according to further possible embodiments. At a step or action 1202 a current output bit of the random bit stream is determined by using a portion of a current internal state of the method for generating the random bit stream. This step 1202 of determining the current output bit may comprise, in some embodiments, an evaluation of a logical combination of bit values representing the portion of the current internal state.

The internal state is then modified, at step 1204, using at least another portion of the current internal state and the current output bit.

According to further embodiments which will be explained using FIGS. 13 to 19, a hybrid random number generator may comprise a third module or further module in addition to the true random number generator and the cryptographic postprocessing. This additional module may be called "external EBS producer", for example, where "EBS" stands for "Extended Backward Secrecy". The module may generate a bit sequence in a permanent manner, that is permanently fed into the internal state of the cryptographic postprocessing.

Figure 13:
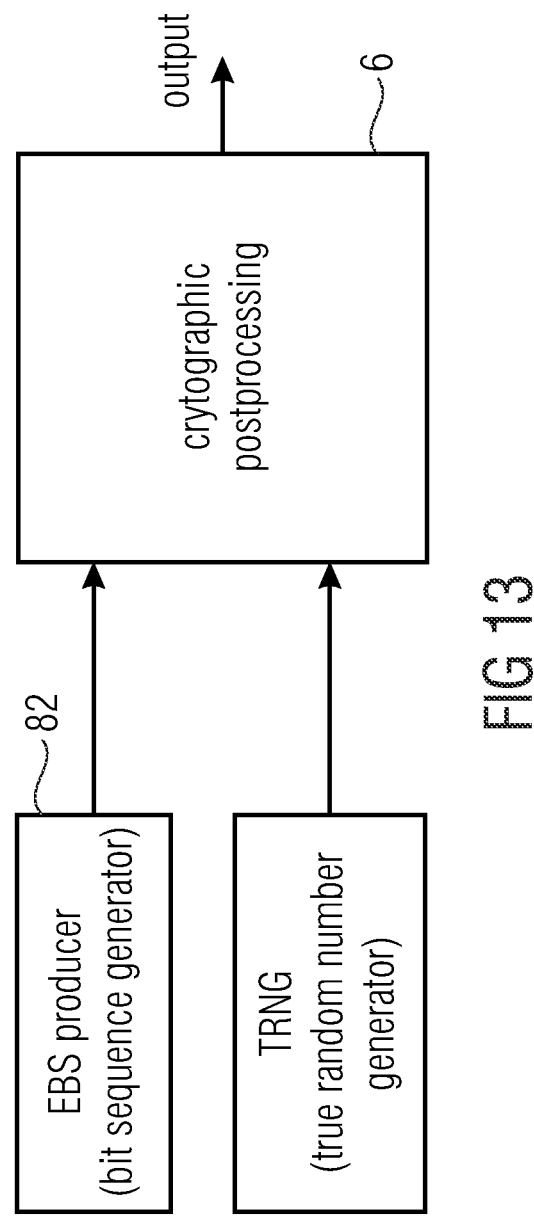
FIG. 13 shows a schematic block diagram of a hybrid random number generator with the property of enhanced backward secrecy according to some embodiments.

FIG. 13 shows a schematic block diagram of a corresponding HRNG. The HRNG schematically illustrated in FIG. 13 comprises the cryptographic postprocessing 6, the true random number generator TRNG, and as the additional module an auxiliary bit sequence producer 82. The auxiliary bit sequence producer 82 may be regarded as an enhanced backward secrecy producer (EBS producer) and is typically configured to produce a bit sequence. The bit sequence produced by the auxiliary bit sequence producer 82 may be a random bit sequence or a pseudorandom bit sequence which is provided as an additional input to the cryptographic postprocessing 6.

The cryptographic postprocessing 6 can be a block cipher or a stream cipher. In the following description, the focus is on stream ciphers. Nevertheless, the subsequent description is also valid for the most part for block ciphers.

As a side remark it is pointed out that for each output bit produced by the HRNG, one bit from the EBS producer 82 is fed into the cryptographic postprocessing 6. Accordingly, the ratio of inputs from the EBS producer 82 into the cryptographic postprocessing 6 and output bits provided by the cryptographic postprocessing 6 is 1:1 in this example. However, another ratio may be valid for the input to the cryptographic postprocessing 6 that is provided by the true random number generator TRNG. While the bits provided by the TRNG may also enter the cryptographic postprocessing 6 with a ratio of 1:1, the ratio could be 5:1, as well, in which case the cryptographic postprocessing 6 would function as a compressor of the TRNG bits. In contrast, the ratio could be for example 1:16, in which case the cryptographic postprocessing 6 would function as an expander of the TRNG bits.

According to embodiments schematically illustrated in FIGS. 13, 14, 17, 18, and 19, the sought after property of enhanced backward secrecy for the cryptographic postprocessing algorithm in a Hybrid RNG may be achieved by generating an outer bit sequence and feeding this outer bit sequence permanently (i.e., typically with the ratio 1:1) into the internal state of the cryptographic postprocessing 6.

By feeding unknown bits into the internal state the property of the cryptographic postprocessing algorithm is lost according to which each internal state has a unique defined (and determinable) predecessor state. In other words, the postprocessing algorithm obtains the property of enhanced backward secrecy due to the fact that unknown bits are fed into the internal state.

A possible implementation of the EBS producer 82 consists in a 64 bit long memory which contains a 64 bit secret key. During operation of the EBS producer 82, the key bits are read and fed into the cryptographic postprocessing 6 in a sequential manner.

The enhanced backward secrecy is in this case implemented with a strength of $2^{64}$: an attacker who has managed to obtain knowledge of the internal state of the cryptographic postprocessing 6, but who does not know the 64 bit key within the EBS producer, has $2^{64}$ possibilities to conclude onto previous internal states, or, for that matter, onto random numbers that have been output in the past (under the assumption that the TRNG has delivered no inputs—be it because it has failed or be it because the HRNG is currently in an expansion phase).

Another possible implementation of the EBS producer consists in a, for example, 64 bit long maximal periodic linear feedback shift register (LFSR). This shift register produces an output sequence of the period length $2^{64}-1$ when the LFSR is initialized with an arbitrary initial state (typically, the all-zero state should be avoided as the initial state). In other words, one may use a 64 bit long secret key (which typically should not contain all zeros) and initializes the 64-bit LFSR with this secret key. The 64-bit LFSR produces a pseudorandom sequence of the period length $2^{64}-1$ in an autonomous manner. This sequence is the output sequence of the EBS producer which is fed into the cryptographic postprocessing 6 of the HRNG with the ratio 1:1.

Further possible implementation of the EBS producer 82 consists in a 64-bit maximal periodic LFSR as in the previous example. This LFSR is, however, not operated in an autonomous manner, but it receives inputs from the noise source of the TRNG in regular or irregular intervals. This will be explained in further detail in the context of the description of FIG. 14.

According to some embodiments the EBS producer 82 may be better physically protected than the internal state of the cryptographic postprocessing 6. Reason: assume the TRNG has failed. Accordingly, the 64-bit LFSR within the EBS producer 82 runs in an autonomous manner. An attacker who would manage to gain knowledge in this situation of both the internal state of the cryptographic postprocessing algorithm and the state of the EBS-LFSR but then again be capable of determining the random numbers which have been generated in the past.

Figure 14:
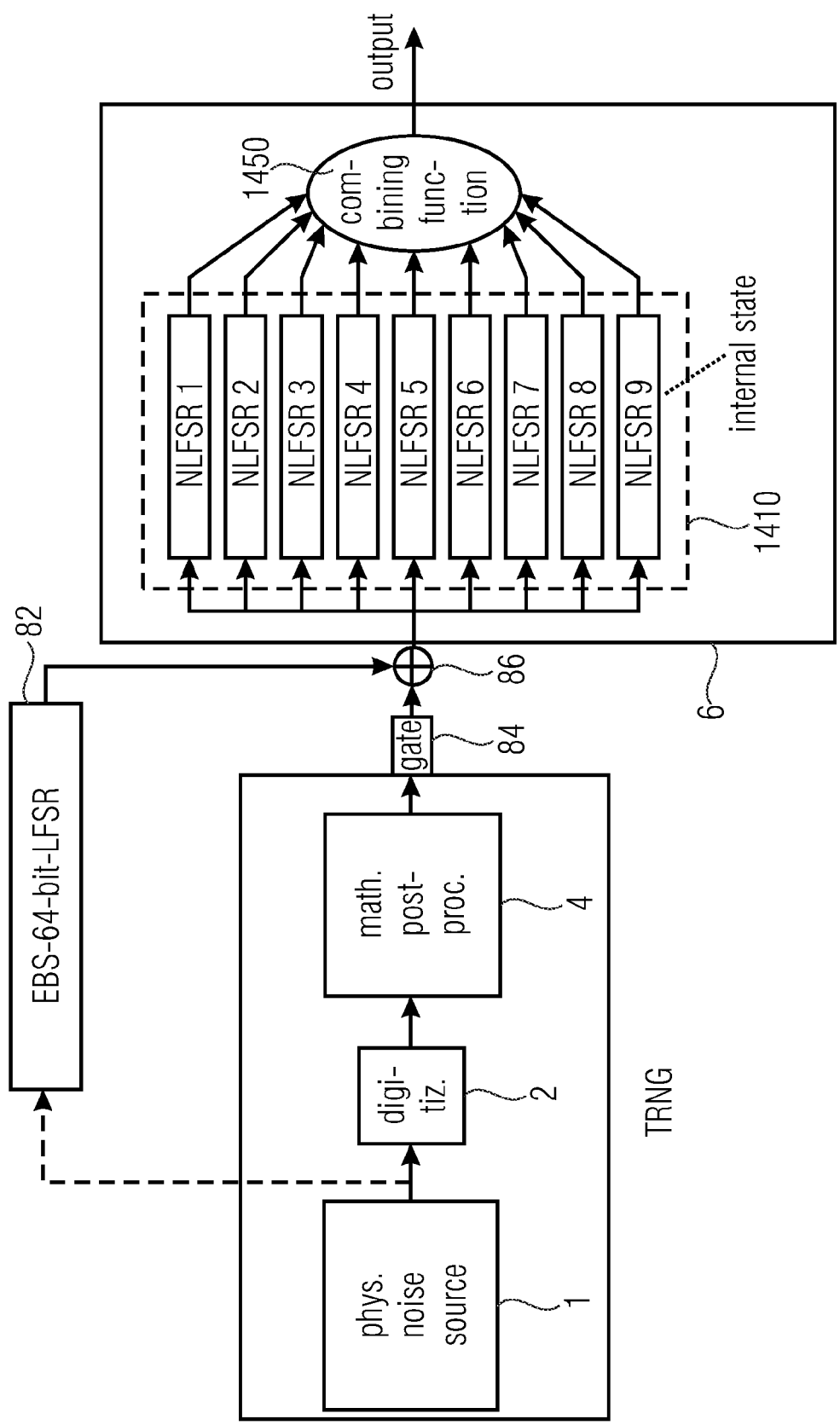
FIG. 14 shows a schematic block diagram of a hybrid random number generator with the property of enhanced backward secrecy according to some further embodiments.

FIG. 14 shows a schematic block diagram of a random bit sequence generator according to some embodiments comprising: an auxiliary bit sequence producer or EBS producer 82. In this example a 64-bit maximal periodic LFSR with inputs from the physical noise source of the TRNG (dashed line) is used as the EBS producer for the auxiliary bit sequence producer 82.

The cryptographic postprocessing algorithm is implemented as a stream cipher. Within the stream cipher nine nonlinear maximal periodic feedback shift registers (NLFSRs) form or store the internal state.

During the extension phase the HRNG provides more bits at its output then TRNG bits are fed into the internal state of the cryptographic postprocessing 6. Accordingly, the gate is closed during a majority of the time. Independently from whether the gate is open or closed (i.e., their true random bits from the TRNG are fed into the internal state of the cryptographic postprocessing 6 or not), one bit from the auxiliary bit sequence producer (EBS-64-bit LFSR) is fed into the internal state with every bit that is output by the HRNG.

The cryptographic postprocessing 6 comprises the internal state 1410, which in turn comprises the nine nonlinear feedback shift registers NLFSR1 to NLFSR9. The cryptographic postprocessing 6 further comprises a combining function or output function 1450.

The random bit stream generator shown in FIG. 14 further comprises the gate 84 which is arranged at an output of the TRNG. The gate 84 can be opened in order to provide true random data to the cryptographic postprocessing 6. The random bit stream generator further comprises an auxiliary bit sequence combiner 86 in the form of an XOR gate or function. The auxiliary bit sequence combiner 86 is configured to logically combine (i.e., to combine using logic functions such as XOR) the auxiliary bit sequence with the gate output data provided at an output of the gate 84. In other words, the auxiliary bit sequence combiner 86 is configured to logically combine the auxiliary bit sequence with a true random bit sequence provided by the true random number generator during an activity period of the true random number generator, and with a constant value provided at the output of the gate 84 during a period of inactivity of the TRNG. The output of the gate 84 can be regarded as a register input data for the plurality of feedback shift registers 1410 which is combined with the auxiliary bit sequence provided by the auxiliary bit sequence producer 82.

Figure 15:
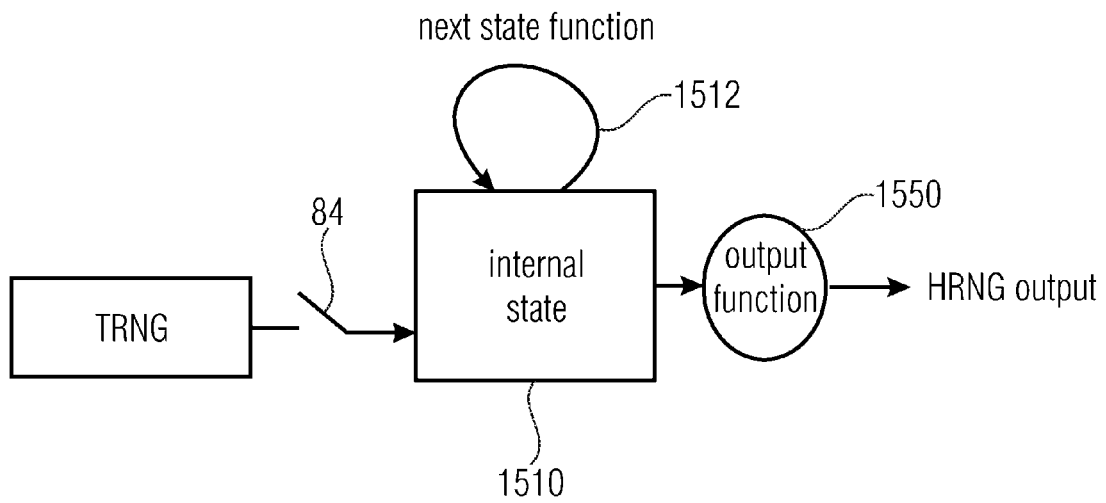
FIG. 15 shows a schematic block diagram of a hybrid random number generator without the property of enhanced backward secrecy.

FIG. 15 shows a schematic block diagram of a hybrid random number generator without enhanced backward secrecy which may be compared with hybrid random number generators according to embodiments so that the measures and the elements providing the enhanced backward secrecy property may become more apparent. The hybrid random number generator (HRNG) shown in FIG. 15 comprises the true random number generator, the gate 84 between an output of the TRNG and an input of the internal state 1510, a next state function 1512, and an output function 1550. When the gate 84 is closed (i.e., the switch representing the gate 84 is open), no random numbers are fed from the TRNG into the internal state 1510. Hence, the HRNG is in an extension phase.

Since the next state function 1512 is bijecive, an attacker who was able to learn about the internal state at the time instant t can determine the preceding internal states. With this knowledge he can also determine the random numbers output by the HRNG in the past.

Figure 16:
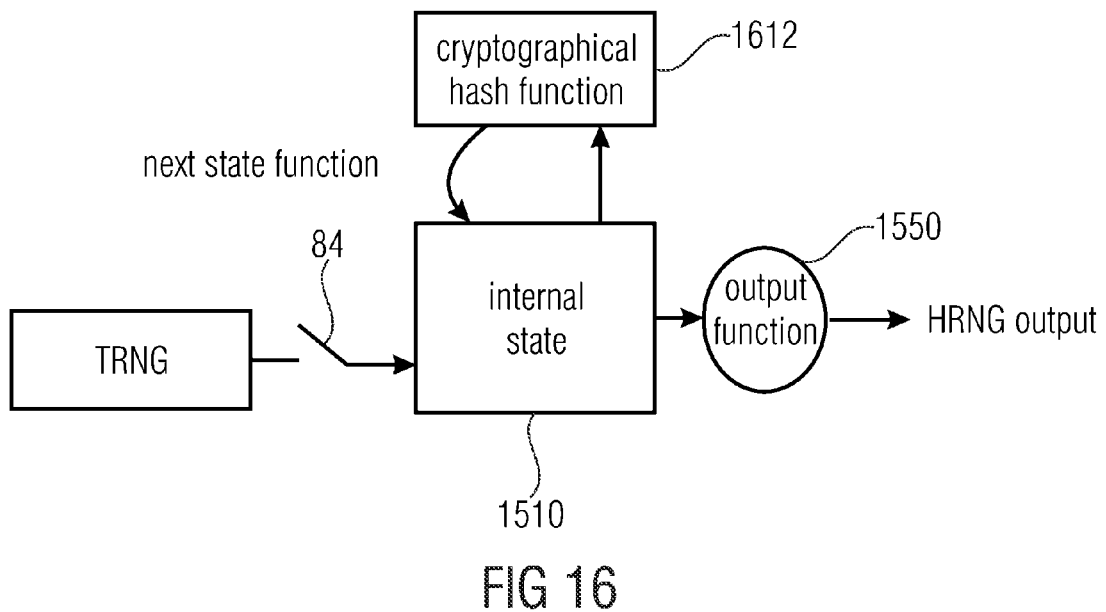
FIG. 16 shows a schematic block diagram of a hybrid random number generator with the property of enhanced backward secrecy achieved by using a hash function.

FIG. 16 shows a schematic block diagram of a HRNG which is not according to an embodiment. The HRNG shown in FIG. 16 has the property of enhanced backward secrecy which is, however, achieved using a cryptographic hash function 1612. The cryptographic hash function 1612 is part of the next state function. Except for the difference in the next state function, the HRNGs in FIGS. 15 and 16 are substantially identical.

The cryptographic hash function 1612 works as follows. The cryptographic hash function 1612 is involved in the calculation of the next internal state from the current internal state. A cryptographic old hash function has the property that its values can be calculated in an efficient way, but the inverse function is practically not calculable (computationally infeasible). Due to this property of a cryptographic hash function, the attacker who has come to learn the internal state at the time instant t cannot calculate preceding internal states. Accordingly, the attacker cannot determine the random numbers output by the HRNG in the past. However, embodiments provide a different way to prevent an attacker from determining the random numbers output by the random bit stream generator or HRNG in the past, as will be described now in connection with FIGS. 17 to 19.

Figure 17:
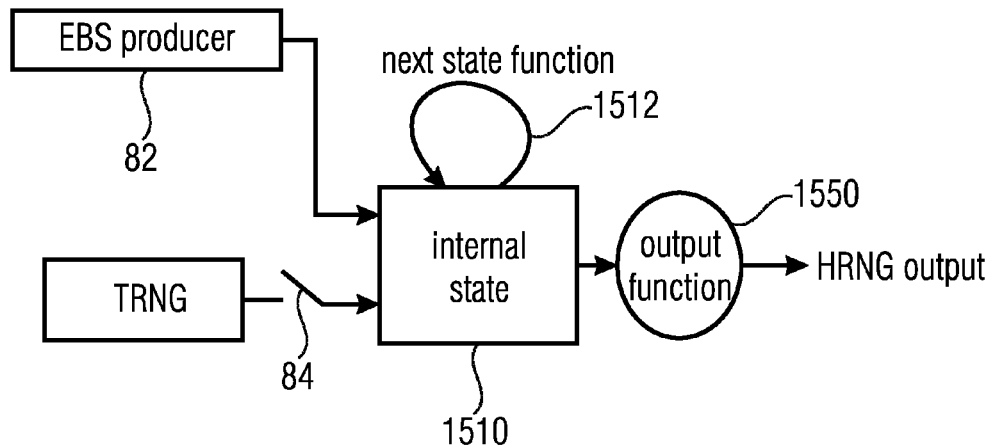
FIG. 17 shows a schematic block diagram of a hybrid random number generator according to some embodiments with enhanced backward secrecy achieved by permanent influence of the bit sequence generated in the EBS module on the internal state.
Figure 18:
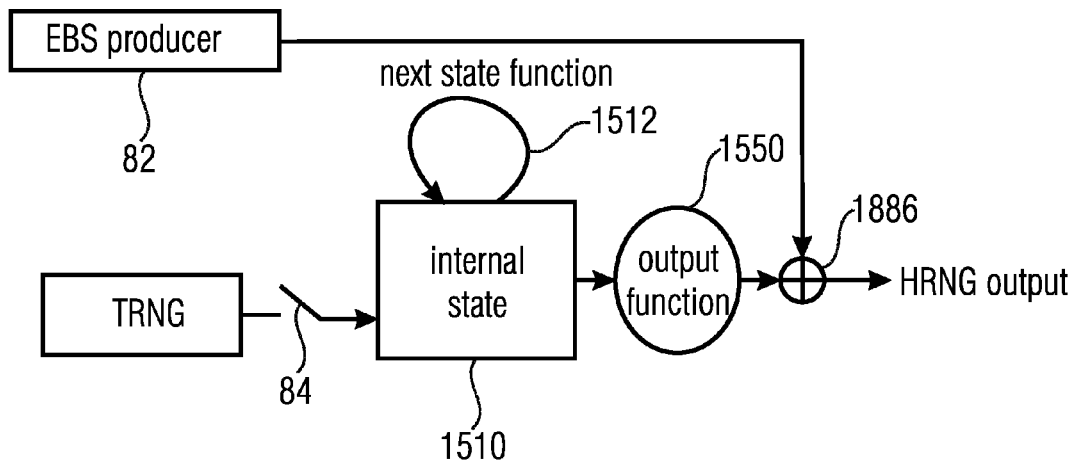
FIG. 18 shows a schematic block diagram of a hybrid random number generator according to some further embodiments with enhanced backward secrecy achieved by permanent influence of the bit sequence generated in the EBS module on the HRNG output sequence.
Figure 19:
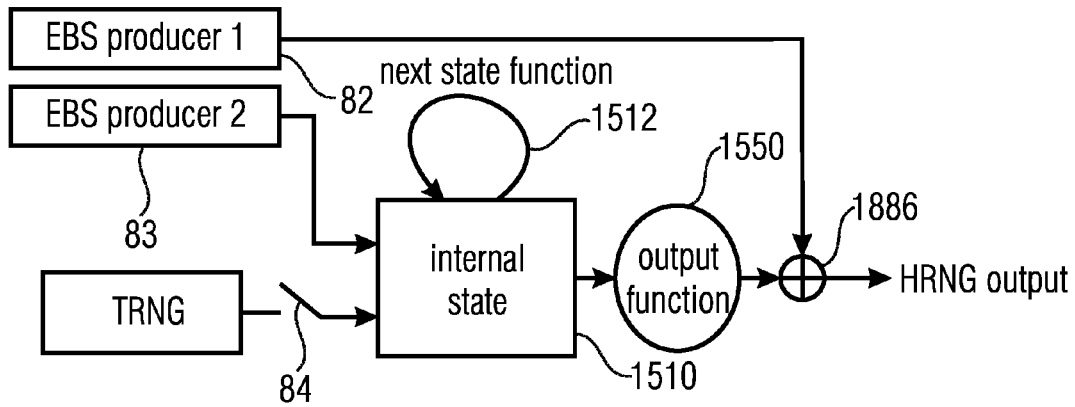
FIG. 19 shows a schematic block diagram of a hybrid random number generator according to some further embodiments with enhanced backward secrecy that combines the embodiments of FIGS. 17 and 18.

In FIGS. 17 to 19 schematic block diagrams of the random bit stream generators or HRNGs are shown that provide the property of enhanced backward secrecy via a permanent influence of a bit sequence generated by an EBS producer 82 on to the internal state and/or a HRNG output sequence.

FIG. 17 shows a schematic block diagram of a random bit sequence generator or HRNG with enhanced backward secrecy obtained by a permanent influence of the sequence generated within the EBS producer module 82 onto the internal state. The EBS producer or auxiliary bit sequence producer 82 is connected at an input side to the internal state memory 1510 so that the auxiliary bit sequence can be logically combined with register input data fed into the feedback shift registers of the internal state memory 1510. The internal state 1510 at the time instant t is now a function of the auxiliary bit sequence provided by the auxiliary bit sequence producer 82. Especially in case the auxiliary bit sequence producer 82 is physically protected by one or more shield layers within a semiconductor chip comprising the random bit stream generator, it is very difficult for an attacker to determine the value of a specific bit provided by the auxiliary bit sequence producer 82 to the internal state 1510 in the past. The number of possibilities that the attacker would have to check doubles with every clock phase that the attacker wants to go back in time to determine a preceding internal state at a time instant t−nT, where T is the time interval corresponding to one clock phase.

FIG. 18 shows a schematic block diagram of a random bit stream generator or HRNG according to further embodiments with enhanced backward secrecy. The property of enhanced backward secrecy is achieved by a permanent influence of the bit sequence generated in the auxiliary bit sequence producer (EBS producer) 82 on to the HRNG output sequence. To this end, the auxiliary bit sequence combiner 1886 it is arranged at an output of the output function 1550 in order to logically combine a current bit of the auxiliary bit sequence with the output bit provided by the output function 1550.

FIG. 19 shows a schematic block diagram of a random bit stream generator according to further embodiments. The random bit stream generator HRNG schematically shown in FIG. 19 is basically a combination of the embodiments shown in FIGS. 17 and 18. The random bit stream generator comprises a first auxiliary bit sequence producer 82 configured to produce a first auxiliary bit sequence and a second auxiliary bit sequence producer configured to produce a second auxiliary bit sequence. The random bit stream generator further comprises a first auxiliary bit sequence combiner configured to logically combine the auxiliary bit sequence (or a current bit thereof) with the output bit provided by the output function 1550, resulting in a corresponding bit of the random bit stream or HRNG output. The first auxiliary bit sequence combiner is again the XOR function or gate 1886. The random bit stream generator or HRNG further comprises a second auxiliary bit sequence combiner (not explicitly shown in FIG. 19) configured to logically combine the second auxiliary bit sequence with the register input data. The random bit stream generator or HRNG according to the embodiment schematically illustrated in FIG. 19 provides the property of enhanced backward secrecy by: 1) permanent influence of the first auxiliary bit sequence generated in the first auxiliary bit sequence producer 82 onto the HRNG output sequence, and 2) permanent influence of the second auxiliary bit sequence generator within the second auxiliary bit sequence producer 83 on to the next internal state, i.e., the register input data.

The embodiments schematically illustrated in FIGS. 17 to 19 and further similar embodiments relate to an external EBS producer.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

In the foregoing Detailed Description, it can be seen that various features are grouped together in embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Furthermore, in some embodiments a single step may include or may be broken into multiple sub steps. Such sub steps may be included and part of the disclosure of this single step unless explicitly excluded.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A random bit stream generator for generating a random bit stream, the random bit stream generator comprising:
   a plurality of feedback shift registers configured to store a plurality of bit values that represent an internal state of the random bit stream generator, wherein each feedback shift register comprises a register input for receiving register input data and a register output for providing register output data;
   a Boolean output function configured to receive the register output data provided by the register outputs of the plurality of feedback registers, to perform a first Boolean combination of the register output data, and to provide a corresponding output bit, wherein a plurality of successive output bits form the random bit stream;
   a feedback loop configured to perform a second Boolean combination of the output bit with at least one register feedback bit of at least one of the feedback shift registers, so that the register input data for the at least one feedback shift register is a function of the output bit;
   an auxiliary bit sequence producer configured to produce an auxiliary bit sequence;
   an auxiliary bit sequence combiner configured to logically combine the auxiliary bit sequence with the output bit;
   a second auxiliary bit sequence producer configured to produce a second auxiliary bit sequence; and
   a second auxiliary bit sequence combiner configured to logically combine the second auxiliary bit sequence with the register input data.

2. The random bit stream generator according to claim 1, wherein at least one of the plurality of feedback shift registers is a linear feedback shift register.

3. The random bit stream generator according to claim 1, wherein at least one of the plurality of feedback shift registers is a non-linear feedback shift register.

4. The random bit stream generator according to claim 1, wherein at least two of the plurality of feedback shift registers have different lengths.

5. The random bit stream generator according to claim 1, wherein the second Boolean combination performed by the feedback loop is an exclusive OR combination of the output bit and the register feedback bit of the at least one feedback register.

6. The random bit stream generator according to claim 1, wherein each of the plurality of feedback shift registers comprises a feedback function configured to determine the register feedback bit of the corresponding feedback shift register on the basis of a Boolean combination of selected bit values stored by the corresponding feedback shift register.

7. The random bit stream generator according to claim 1, further comprising a state initializer configured to initialize the internal state of the feedback shift register on the basis of a seed information.

8. The random bit stream generator according to claim 7, wherein the state initializer comprises a logical initializing function configured to receive the seed information as an input and to load the plurality of feedback shift registers with the bit values representing an initial state of the random bit stream generator that is associated to the seed information.

9. The random bit stream generator according to claim 1, further comprising a random information interface configured to receive a random bit sequence from a random generator or a pseudorandom bit sequence from a pseudorandom generator, wherein the feedback loop is configured to process the random bit sequence or the pseudorandom bit sequence so that the register input of the at least one feedback shift register is also a function of the random bit sequence or the pseudorandom bit sequence.

10. The random bit stream generator according to claim 1, wherein the auxiliary bit sequence producer comprises a feedback shift register.

11. The random bit stream generator according to claim 1, wherein the random bit stream generator is a random number generator or a pseudo random number generator.

12. The random bit stream generator according to claim 1, wherein the random bit stream generator is a stream cipher generator.

13. A random bit stream generator for generating a random bit stream, the random bit stream generator comprising:
   an internal state memory configured to store an internal state of the random bit stream generator;
   an output function configured to use at least a portion of a current internal state for determining a current output bit of the random bit stream; and
   an internal state modifier configured to modify the internal state using another portion of the current internal state and the current output bit of the random bit stream.

14. The random bit stream generator according to claim 13, wherein the internal state modifier is configured to perform a Boolean combination of the at least one other portion of the current internal state and the current output bit to determine one or more bit values to be fed into the internal state memory.

15. The random bit stream generator according to claim 13, wherein the internal state memory comprises a plurality of shift registers.

16. The random bit stream generator according to claim 13, further comprising a state initializer configured to initialize the internal state of the random bit stream generator on the basis of a seed information.

17. The random bit stream generator according to claim 16, wherein the state initializer comprises a logical initializing function configured to receive the seed information as an input and to load the internal state memory with the bit values representing the initial state of the random bit stream generator that is associated to the seed information.

18. The random bit stream generator according to claim 13, further comprising a random information interface configured to receive a random bit sequence from a random generator, wherein the internal state modifier is configured to process the random bit sequence so that the internal state is also a function of the random bit sequence.

19. The random bit stream generator according to claim 13, wherein the random bit stream generator is a stream cipher generator.

20. A method for generating a random bit stream, the method comprising:
reading, from a state memory, a first portion of a current internal state of the method for generating the random bit stream, the first portion of the current internal state being represented by a plurality of bit values;
determining a new output bit of the random bit stream on the basis of a Boolean combination of the plurality of bit values representing the first portion of the current internal state;
determining at least one new input bit value for a next internal state on the basis of the new output bit and a second portion of the current internal state; and
feeding the new input bit value to the state memory in order to modify the current internal state to the next internal state.

21. The method according to claim 20, wherein the state memory comprises a plurality of feedback shift register and determining the at least one new input bit value for the next internal state comprises performing a logical combination of the new output bit and second portion of the internal state, the second portion being represented by a plurality of feedback bits provided by the current internal state, and wherein feeding the new input to the state memory comprises feeding a plurality of new input bit values to the plurality of feedback shift registers at respective input bits of the plurality of feedback shift registers.

22. The method according to claim 20, further comprising:
initializing the internal state by feeding a seed information to the state memory prior to the step of reading the first portion of the current internal state.

23. The method according to claim 20, wherein the method is performed iteratively and wherein after a predetermined number of iterations or after a random number of iterations the method further comprises:
receiving a random information from a random number generator;
using the random information when determining the at least one new input bit value for the next internal state so that the new input bit value is determined on the basis of the new output bit, the second portion of the current internal state, and the random information.

24. A computer readable digital storage medium having stored thereon a computer program having a program code for performing, when running on a computer, a method for generating a random bit stream, the method comprising:
reading, from a state memory, a first portion of a current internal state of the method for generating the random bit stream, the first portion of the current internal state being represented by a plurality of bit values;
determining a new output bit of the random bit stream on the basis of a Boolean combination of the plurality of bit values representing the first portion of the current internal state;
determining at least one new input bit value for a next internal state on the basis of the new output bit and a second portion of the current internal state; and
feeding the new input bit value to the state memory in order to modify the current internal state to the next internal state.

* * * * *